United States Patent
Waltz et al.

(10) Patent No.: US 8,892,294 B2
(45) Date of Patent: *Nov. 18, 2014

(54) VEHICLE CONTROL LIMITS

(71) Applicant: Crown Equipment Corporation, New Bremen, OH (US)

(72) Inventors: Lucas B. Waltz, Coldwater, OH (US); Bing Zheng, Sidney, OH (US); Thomas L. Mallak, Spencerville, OH (US); Steve Mangette, Lima, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/208,852

(22) Filed: Mar. 13, 2014

(65) Prior Publication Data

US 2014/0195076 A1 Jul. 10, 2014

Related U.S. Application Data

(63) Continuation of application No. 13/626,400, filed on Sep. 25, 2012, now Pat. No. 8,718,860, which is a continuation of application No. PCT/US2012/052837, filed on Aug. 29, 2012.

(60) Provisional application No. 61/528,494, filed on Aug. 29, 2011.

(51) Int. Cl.
  *G05D 1/02* (2006.01)
  *B66F 9/06* (2006.01)

(52) U.S. Cl.
  CPC .............. *B66F 9/063* (2013.01); *G05D 1/0223* (2013.01); *G05D 1/0274* (2013.01); *G05D 2201/0216* (2013.01)
  USPC .................. 701/25; 701/2; 340/988; 700/245

(58) Field of Classification Search
  CPC .... B66F 9/063; G05D 1/0223; G05D 1/0274; G05D 2201/0216
  USPC .............. 701/1, 2, 23–25, 408; 340/988, 989; 901/1; 700/245, 253
  See application file for complete search history.

(56) References Cited

U.S. PATENT DOCUMENTS 3,567,048 A 3/1971 Whitham
3,942,088 A 3/1976 Yosioka et al.
(Continued)

OTHER PUBLICATIONS

Office Action pertaining to U.S. Appl. No. 13/626,385 dated May 22, 2013.

(Continued)

*Primary Examiner* — Russell Frejd
(74) *Attorney, Agent, or Firm* — Dinsmore & Shohl LLP

(57) ABSTRACT

Included are embodiments for providing vehicle control limits. One embodiment of a system includes a navigation system and a vehicle that includes a memory component that stores a program. Embodiments of the system are configured to receive an indication for automatic control of the vehicle, receive a route for the vehicle to reach a destination for completing a work order from the navigation system, and determine a vehicle limit, wherein the vehicle limit is based on a current state of the vehicle. Some embodiments are configured to communicate the vehicle limit from a vehicle control module (VCM) to a navigation control module (NCM), determine, via the NCM, an automatic command based on the destination and the vehicle limit and send the automatic command to a motor of the vehicle.

19 Claims, 7 Drawing Sheets

(56) References Cited

U.S. PATENT DOCUMENTS

| | | | |
|---|---|---|---|
| 4,040,500 A | 8/1977 | Blakeslee | |
| 4,077,486 A | 3/1978 | Blakeslee et al. | |
| 4,083,422 A | 4/1978 | Blakeslee et al. | |
| 4,279,487 A | 7/1981 | Baker et al. | |
| 4,319,820 A | 3/1982 | Ostrowski et al. | |
| 4,744,408 A | 5/1988 | Pearson et al. | |
| 5,068,790 A | 11/1991 | Wellman | |
| 5,184,122 A | 2/1993 | Decious et al. | |
| 5,213,548 A | 5/1993 | Colbert et al. | |
| 5,401,223 A | 3/1995 | White et al. | |
| 5,557,519 A | 9/1996 | Morita | |
| 5,625,558 A | 4/1997 | Togai et al. | |
| 5,726,890 A | 3/1998 | Takamoto et al. | |
| 5,778,327 A | 7/1998 | Simmons et al. | |
| 5,778,853 A | 7/1998 | Saito | |
| 5,795,264 A | 8/1998 | Steeby et al. | |
| 5,938,710 A | 8/1999 | Lanza et al. | |
| 5,938,711 A | 8/1999 | Steeby et al. | |
| 5,995,001 A | 11/1999 | Wellman et al. | |
| 5,995,884 A | 11/1999 | Allen et al. | |
| 6,050,359 A | 4/2000 | Mouri et al. | |
| 6,220,219 B1 | 4/2001 | Waddas et al. | |
| 6,317,637 B1 | 11/2001 | Limroth | |
| 6,414,594 B1 | 7/2002 | Guerlain | |
| 6,445,984 B1 | 9/2002 | Kellogg | |
| 6,553,302 B2 | 4/2003 | Goodnight et al. | |
| 6,591,172 B2 | 7/2003 | Oda et al. | |
| 6,643,578 B2 | 11/2003 | Levine | |
| 6,781,516 B2 | 8/2004 | Reynard et al. | |
| 6,789,008 B2 | 9/2004 | Kato et al. | |
| 6,813,557 B2 | 11/2004 | Schmidt et al. | |
| 6,853,877 B1 | 2/2005 | Slater et al. | |
| 6,931,958 B2 | 8/2005 | Takeda | |
| 6,995,688 B2 | 2/2006 | Reynolds | |
| 7,099,745 B2 * | 8/2006 | Ebert | 700/245 |
| 7,344,037 B1 | 3/2008 | Zakula, Sr. et al. | |
| 7,366,600 B2 | 4/2008 | Osaki et al. | |
| 7,444,193 B2 | 10/2008 | Cutler | |
| 7,634,332 B2 | 12/2009 | Williams et al. | |
| 7,739,006 B2 | 6/2010 | Gillula | |
| 7,865,277 B1 | 1/2011 | Larson et al. | |
| 7,932,827 B2 | 4/2011 | Chand et al. | |
| 8,060,400 B2 | 11/2011 | Wellman | |
| 8,179,286 B2 | 5/2012 | Faus et al. | |
| 8,239,251 B2 | 8/2012 | Wellman | |
| 8,239,252 B2 | 8/2012 | Wellman | |
| 8,249,910 B2 | 8/2012 | Wellman et al. | |
| 2003/0154319 A1 | 8/2003 | Araki et al. | |
| 2004/0193363 A1 | 9/2004 | Schmidt et al. | |
| 2005/0075784 A1 | 4/2005 | Gray et al. | |
| 2005/0131645 A1 | 6/2005 | Panopoulos | |
| 2005/0187752 A1 | 8/2005 | Colby et al. | |
| 2005/0246078 A1 | 11/2005 | Vercammen | |
| 2006/0064216 A1 | 3/2006 | Palmer | |
| 2006/0089765 A1 | 4/2006 | Pack et al. | |
| 2007/0158128 A1 | 7/2007 | Gratz et al. | |
| 2007/0293989 A1 | 12/2007 | Norris | |
| 2008/0114533 A1 | 5/2008 | Weiss et al. | |
| 2008/0245598 A1 | 10/2008 | Gratz et al. | |
| 2009/0222160 A1 | 9/2009 | Morselli et al. | |
| 2009/0271058 A1 | 10/2009 | Chilson | |
| 2009/0287406 A1 | 11/2009 | Ohi | |
| 2009/0288893 A1 | 11/2009 | Wyall et al. | |
| 2010/0084207 A1 | 4/2010 | Wyall | |
| 2010/0161136 A1 | 6/2010 | Takeshita et al. | |
| 2011/0071718 A1 | 3/2011 | Norris et al. | |
| 2011/0098890 A1 | 4/2011 | Lee et al. | |
| 2011/0251701 A1 | 10/2011 | Jung | |
| 2012/0022761 A1 | 1/2012 | Matsuda | |
| 2012/0065820 A1 | 3/2012 | Morris | |
| 2012/0323432 A1 | 12/2012 | Wong et al. | |

OTHER PUBLICATIONS

Office Action pertaining to U.S. Appl. No. 13/626,396 dated Mar. 22, 2013.
Final Office Action pertaining to U.S. Appl. No. 13/626,396 dated Oct. 16, 2013.
Office Action pertaining to U.S. Appl. No. 13/626,400 dated Mar. 27, 2013.
Final Office Action pertaining to U.S. Appl. No. 13/626,400 dated Sep. 23, 2013.
Search Report and Written Opinion pertaining to International Application No. PCT/US2012/052809 dated Dec. 19, 2012.
Search Report and Written Opinion pertaining to International Application No. PCT/US2012/052837 dated Nov. 15, 2012.
Search Report and Written Opinion pertaining to International Application No. PCT/US2012/052820 dated Jan. 22, 2013.
Notice of Allowance pertaining to U.S. Appl. No. 13/626,400 dated Jan. 8, 2014.
Patent Examination Report No. 1 dated Jun. 20, 2014 pertaining to Australian Patent Application No. 2012302046.
Patent Examination Report pertaining to Australian Patent Application No. 2012302054, dated Jun. 10, 2014.
Communication pursuant to Rules 161(1) and 162 EPC pertaining to European Patent Application No. 12770315.5 dated May 2, 2014.

* cited by examiner

VEHICLE CONTROL LIMITS

CROSS-REFERENCE TO RELATED APPLICATIONS

The present application is filed under 35 U.S.C. 111(a) as a continuation of U.S. application Ser. No. 13/626,400 filed on Sep. 25, 2012, now U.S. Pat. No. 8,718,860 which is a continuation of International Patent Application No. PCT/US12/052,837, filed Aug. 29, 2012, which international application designates the United States and claims the benefit of U.S. Provisional Application Ser. No. 61/528,494 filed Aug. 29, 2011.

BACKGROUND

Embodiments provided herein generally relate to vehicular control limits, and particularly to systems and methods for providing a vehicle control limits for a vehicle under automatic operation mode.

Many warehouse environments utilize one or more forklifts and/or other vehicles for moving products into, out of, and within the warehouse. Accordingly, many current solutions utilize a vehicle operator to determine which products need to be moved and to where those products will be moved. While the vehicle operators may be capable of sufficiently navigating the vehicle to perform the desired tasks, oftentimes, vehicle operators make mistakes, take inefficient routes, and/or otherwise slow the process. As such, many current solutions provide semi-automated and/or fully automated operation of the vehicle. While semi-automated and fully automated operation may provide additional options, oftentimes, system failures arise due to miscommunication between a navigation system and a vehicle control system.

SUMMARY

Included are embodiments for providing vehicle control limits. One embodiment of a system includes a navigation system and a vehicle that includes a memory component that stores a program. Embodiments of the system are configured to receive an indication for automatic control of the vehicle, receive a route for the vehicle to reach a destination for completing a work order from the navigation system, and determine a vehicle limit, wherein the vehicle limit is based on a current state of the vehicle. Some embodiments are configured to communicate the vehicle limit from a vehicle control module (VCM) to a navigation control module (NCM), determine, via the NCM, an automatic command based on the destination and the vehicle limit and send the automatic command to a motor of the vehicle.

Also included are embodiments of a method. Some embodiments of the method include receiving a work order, the work order related to movement of load to a three-dimensional destination, determining a route for a vehicle to reach the three-dimensional destination for completing the work order, and determining a vehicle limit, wherein the vehicle limit is based on a current state of the vehicle. Some embodiments of the method include determining an automatic command based on the three-dimensional destination and the vehicle limit and sending the automatic command to the vehicle.

Also included are embodiments of a vehicle. Some embodiments of the vehicle include a memory component that stores a program that, when executed by a processor, causes the vehicle to receive an indication for automatic control of a vehicle, receive a route to reach a destination, and determine a vehicle limit of the vehicle, wherein the vehicle limit is based on a current state of the vehicle. In some embodiments, the program causes the vehicle to communicate the vehicle limit from a vehicle control module (VCM) to a navigation control module (NCM) and utilize the NCM to navigate the vehicle to the destination, while adhering to the vehicle limit.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
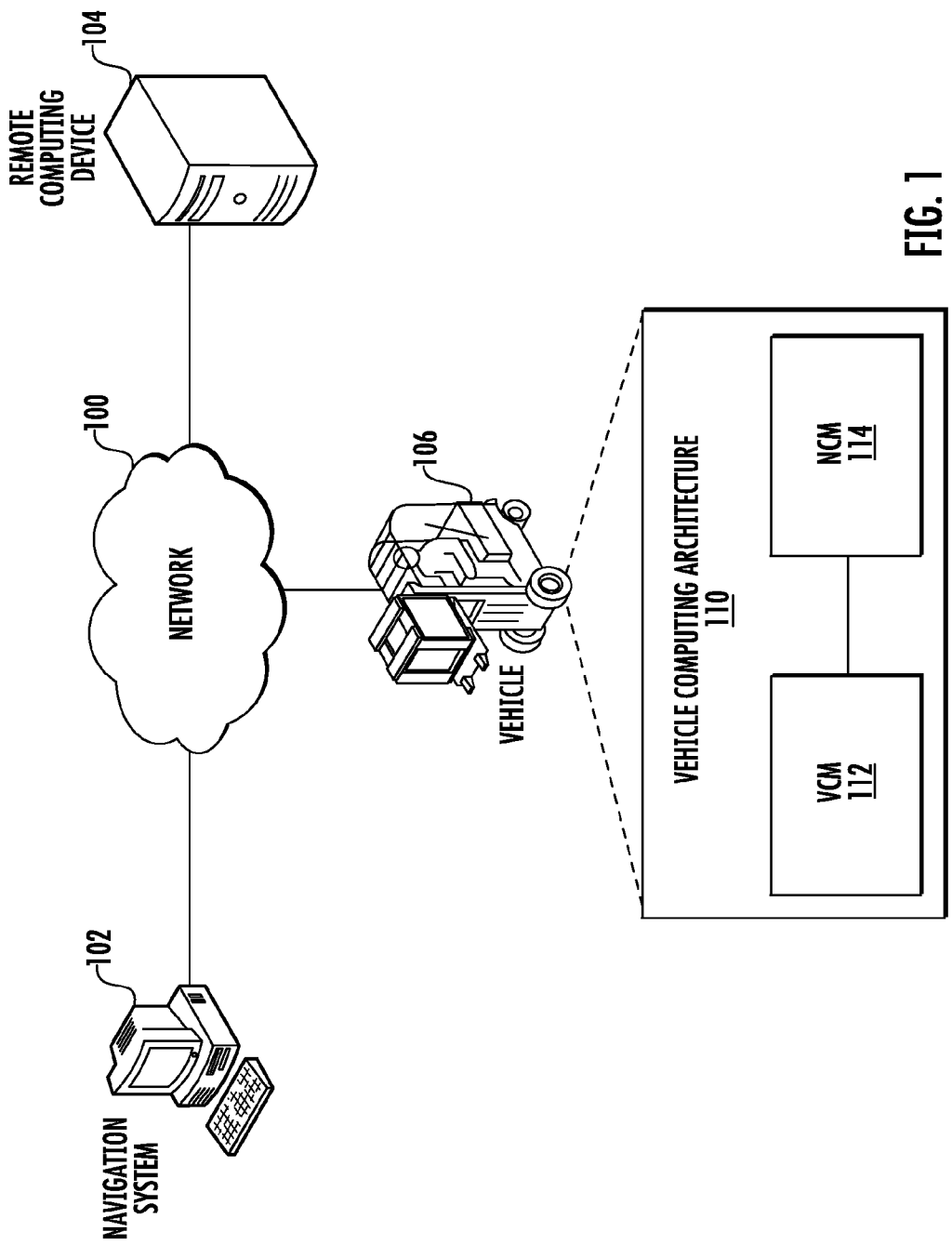
FIG. 1 depicts a computing environment for providing vehicle control limits, according to one or more embodiments shown and described herein.

FIG. 1 depicts a computing environment for providing vehicle control limits, according to one or more embodiments shown and described herein. As illustrated, a network 100 may facilitate communication among a navigation system 102, a remote computing device 104, and a vehicle 106. The network 100 may include a wired and/or wireless local area network, wide area network, and/or other type of network for communicating information. The navigation system 102 may be configured as a server or other computing device and may be located at a warehouse or other environment. The navigation system 102 may be configured for sending navigation to the vehicle 106 and/or receiving navigation data from the vehicle 106. Additionally, the remote computing device 104, which may be implemented as a management computing device or other system, may be configured for processing work orders. The work orders may identify the location of a product that needs to be moved and/or provide other similar information. With the work order information, the navigation system 102 and/or remote computing device 104 may be configured to determine a vehicle for performing the desired task. Additionally, the navigation system 102 may determine an order of priority that tasks are performed by a particular vehicle 106. The navigation system 102 may communicate with the vehicle 106 to determine the location of the vehicle 106. With the location of the vehicle 106, the navigation system 102 may more efficiently assign tasks to the vehicle 106. Additionally, the communication between the navigation system 102 and the vehicle 106 may include sending the predetermined destination and/or routing data to the vehicle 106. The routing data may include a plurality of lines and arcs for reaching a predetermined destination from the current location of the vehicle 106. In some embodiments, however, the vehicle 106 receives coordinates of the predetermined destination and determines its own routing to reach those coordinates.

Also included is the remote computing device 104. The remote computing device 104 may also be configured as a server or other computing device and may be configured to provide the navigation system 102 with the work orders, and/or other information. In some embodiments, the remote computing device 104 may be located on the same premises as the navigation system 102, while in some embodiments the remote computing device 104 may be located remotely from the navigation system 102. Similarly, depending on the particular embodiment, the remote computing device 104 may be configured to service one or more different environments and communicate with one or more different navigation systems.

FIG. 1 also includes the vehicle 106. The vehicle 106 may be configured as a warehouse vehicle, such as a forklift, truck, etc. Additionally, the vehicle 106 may include one or more vehicle control systems, such as a steering system, a braking system, a traction system, etc. The vehicle 106 also includes a user interface, location tracking sensors (such as laser sensors, light sensors, etc.), and vehicle computing architecture 110, which may include a vehicle control module (VCM) 112 and a navigation control module (NCM) 114. As discussed in more detail below, the VCM 112 may facilitate operator initiated control of the vehicle 106 through the use of a manual mode. The NCM 114 may be configured to send a control command to facilitate system-initiated operation of the vehicle 106 through the use of an auto operation mode. Also illustrated is a navigation control interface for facilitating communication and coordination between the VCM 112 and the NCM 114.

Figure 2:
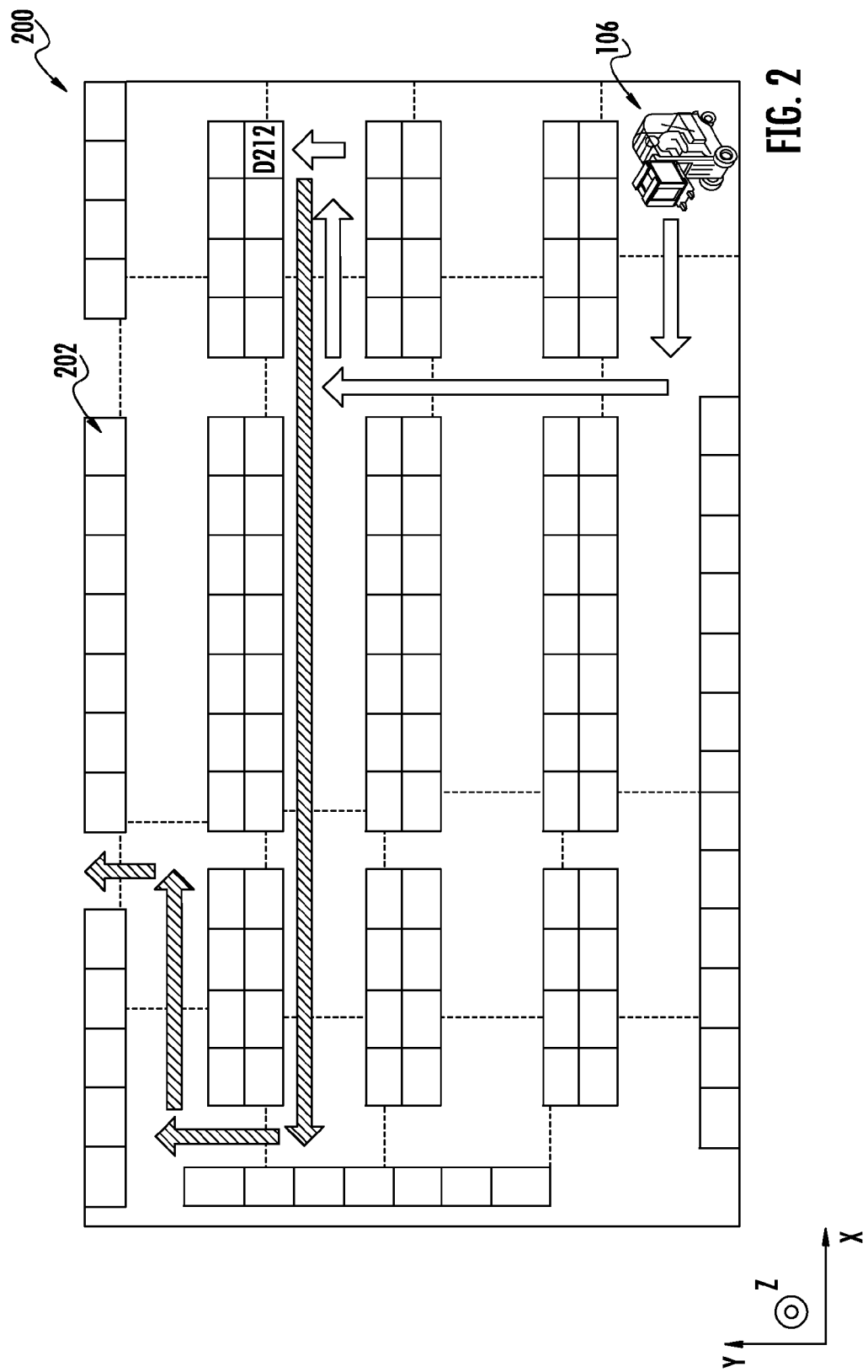
FIG. 2 depicts an environment map for providing vehicle control limits, according to embodiments shown and disclosed herein.

FIG. 2 depicts an environment map 200 for providing vehicle control limits, according to embodiments shown and disclosed herein. As illustrated, the environment map 200 may simulate an environment, such as a warehouse and may include a plurality of products 202. The products may be organized in a predetermined arrangement and may be not only arranged along the floor (in the "x" and "y" directions), but may also be stacked vertically (in the "z" direction). As discussed above, the vehicle 106 may be operated in manual mode by an operator, sending a manual command to the vehicle 106. The operator may then implement a manual control function to manually navigate the vehicle to the predetermined destination, perform the desired task, and then proceed to the next task.

If an automatic command has been sent to the vehicle 106, the vehicle 106 may determine a vehicle condition and operate in automatic mode. Thus, the vehicle 106 may implement automatic control from the NCM 114, the navigation system 102, navigation system operator, vehicle operator, and/or other external source by determining an efficient operation of the vehicle 106 to perform the task and sending a control command based on the efficient operation, vehicle condition and desired task. With this information, the vehicle 106 may travel to a desired location, perform the desired task, and then proceed to the next location.

As an example, if the vehicle 106 is currently operating in automatic mode, the vehicle 106 may receive a task, a predetermined destination (address D212), and/or a route for reaching the predetermined destination. Depending on the information received, the vehicle 106 may calculate a route to the predetermined location at the address D212 and may then perform the task. In this particular example, the task requests the vehicle 106 to pick up the product located at the address D212. From the current location of the vehicle 106, the vehicle 106 may then use sensors and mapping data to navigate according to the determined path. In some embodiments, the vehicle 106 may include a light sensor. The light sensor may determine the relative position of the vehicle 106 with regard to the overhead lighting fixtures. Based on this information, and/or other information (such as laser sensor information, odometer readings, etc.), the vehicle 106 (and/or the navigation system 102) may ensure that the vehicle 106 is on the correct path.

As the vehicle 106 is operated in automatic mode, the vehicle may receive one or more control signals from the NCM 114 to the VCM 112. To prevent the NCM 114 from sending a command to the VCM 112 that violates a predetermined vehicle limit, the VCM 112 and the NCM 114 may communicate vehicle limit data. Specifically, based on a determined weight of a load, height of the fork, and/or other parameters, the vehicle 106 may have an acceleration limit, by which the vehicle 106 may not accelerate beyond a predetermined rate. Similarly, the vehicle 106 may have a fork height limit, a hoist acceleration limit, a hoist speed limit, etc. a steering limit may also be imposed on the vehicle. If the vehicle 106 includes one or more accessories, the vehicle may impose an accessory lower limit, an accessory speed limit, an accessory upper limit, and/or other limits.

While these limits may be easily implemented when the vehicle 106 operates in manual mode, oftentimes automatic mode may send a command for an action that is not permitted. Accordingly, the VCM 112 may communicate limit data with the NCM 114 to prevent confusion within the vehicle 106.

Figure 3:
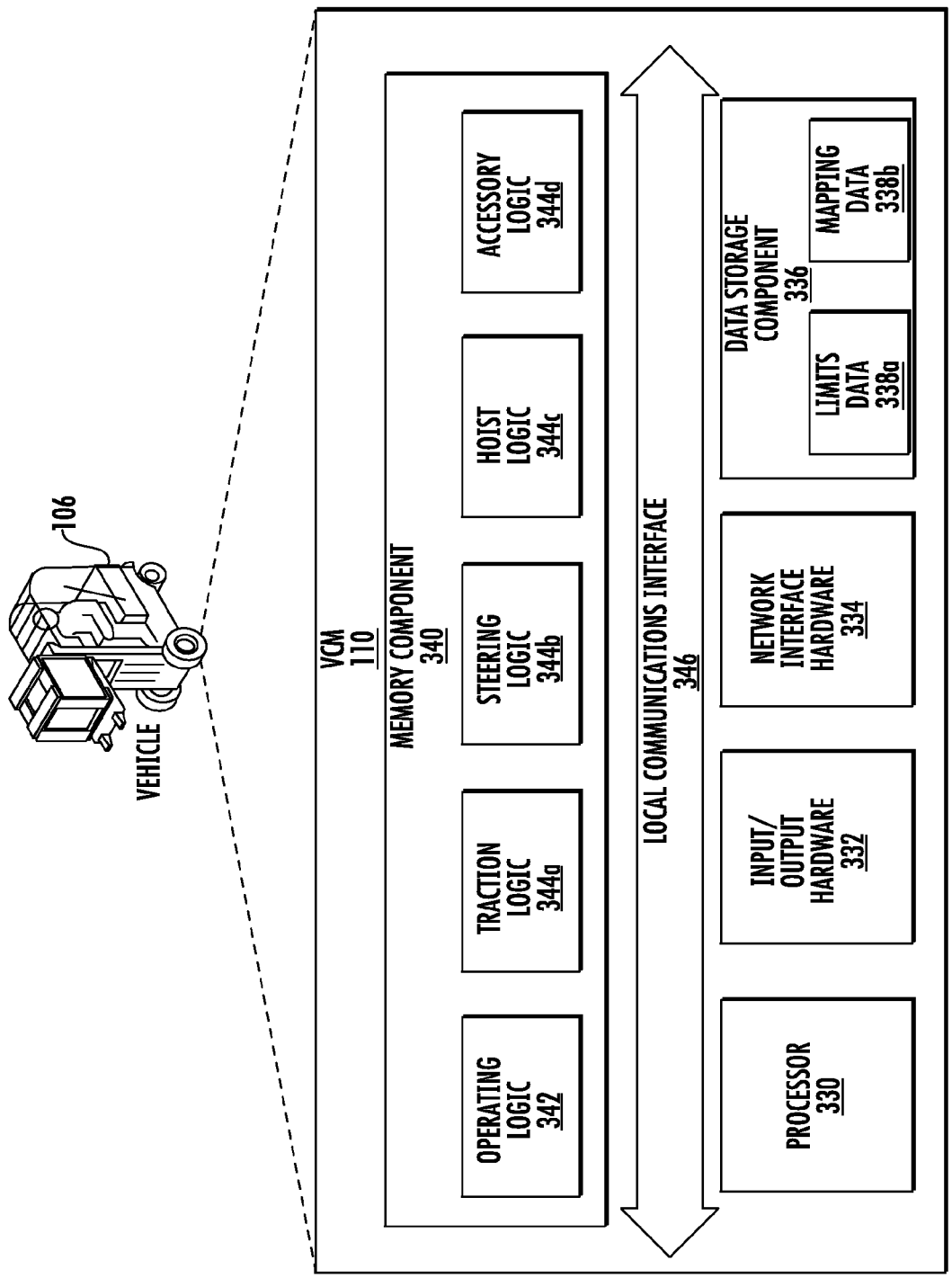
FIG. 3 depicts a computing environment for providing control logic in a vehicle control module, according to one or more embodiments shown and described herein.

FIG. 3 depicts a computing environment for providing control logic in the VCM 112, according to one or more embodiments shown and described herein. In the illustrated embodiment, the VCM 112 includes a processor 330, input/output hardware 332, a data storage component 336 (which stores limits data 338a, mapping data 338b, and/or other data), and the memory component 140. The limits data 338a may include one or more limits that may be placed on the vehicle 106 when in use. Specifically, when the vehicle 106 is turning, the maximum speed may be limited. When the vehicle 106 has raised the vehicle lift, the maximum speed may be limited. Other limits may also be implemented.

The mapping data 338b may include information for the layout of the environment, as illustrated in FIG. 2, as well as the location of products, paths to the products, etc. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, the non-transitory computer-readable medium may reside within the VCM 112 and/or external to the VCM 112.

Additionally, the memory component 140 may store operating logic 342, traction logic 344a, steering logic 344b, hoist logic 344c, and accessory logic 344d. The operating logic 342 may include an operating system and/or other software for managing components of the VCM 112. The traction logic 344a may be configured with one or more algorithms and parameters for facilitating optimal traction control for the vehicle 106. The steering logic 344b may be configured with one or more algorithms and parameters for facilitating optimal steering control of the vehicle 106. The hoist logic 344c may include one or more algorithms and parameters for facilitating optimal hoist control of the vehicle 106. The accessory logic 344d may include one or more algorithms and parameters for facilitating operation of accessories of the vehicle 106. A local communication interface 346 is also included in FIG. 3 and may be implemented as a bus or other communication interface to facilitate communication among the components of the VCM 112.

The processor 330 may include any processing component operable to receive and execute instructions (such as from the data storage component 336 and/or the memory component 140). The input/output hardware 332 may include and/or be configured to interface with a monitor, positioning system, keyboard, touch screen, mouse, printer, image capture device, microphone, speaker, gyroscope, compass, and/or other device for receiving, sending, and/or presenting data. The network interface hardware 334 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the VCM 112 and other computing devices.

It should be understood that the components illustrated in FIG. 3 are merely exemplary and are not intended to limit the scope of this disclosure. While the components in FIG. 3 are illustrated as residing within the VCM 112, this is merely an example. In some embodiments, one or more of the components may reside external to the VCM 112. It should also be understood that while the VCM 112 in FIG. 3 is illustrated as a single device, this is also merely an example. In some embodiments, the traction logic 344a, steering logic 344b, hoist logic 344c, and/or accessory logic 344d may reside on different devices. Additionally, while the VCM 112 is illustrated with traction logic 344a, steering logic 344b, hoist logic 344c, and accessory logic 344d as separate logical components, this is also an example. In some embodiments, a single piece of logic may cause the VCM 112 to provide the described functionality. Further, similar components may also be included in the NCM 114, navigation system 102, and remote computing device 104 to perform the functionality described herein.

Figure 4:
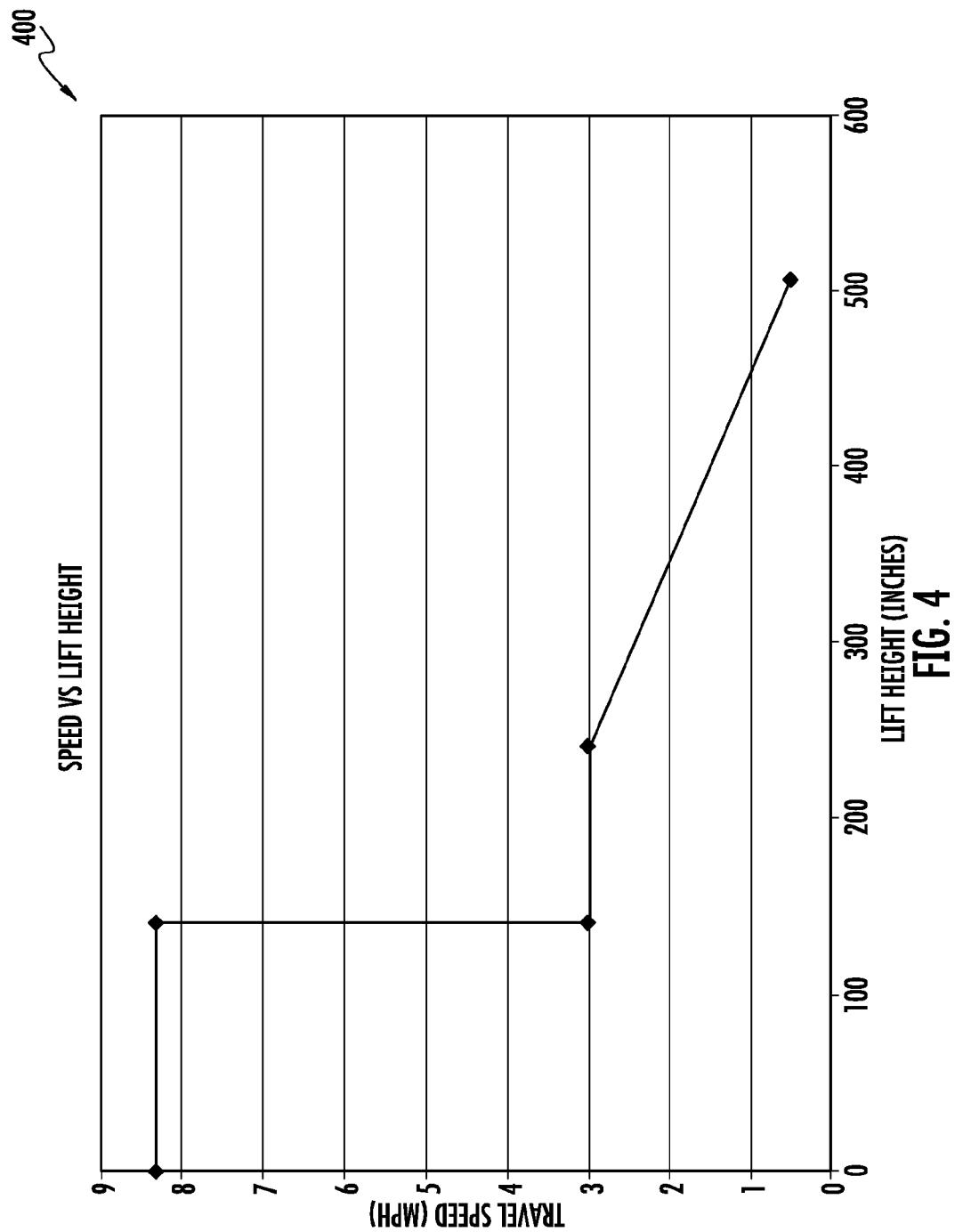
FIG. 4 depicts a graph for providing limits on travel speed versus lift height, according to embodiments shown and described herein.

FIG. 4 depicts a graph 400 for providing limits on travel speed versus lift height, according to embodiments shown and described herein. As illustrated, the graph 400 indicates a lift height versus travel speed of the vehicle 106, where the maximum travel speed is about 8.5 miles per hour when the lift is 0 to about 130 inches. From about 130 inches to about 250 inches, the maximum travel speed is about 3 miles per hour. From about 250 inches to about 500 inches, the maximum speed reduces at a rate of about 1 mph per 100 inches of lift.

Figure 5:
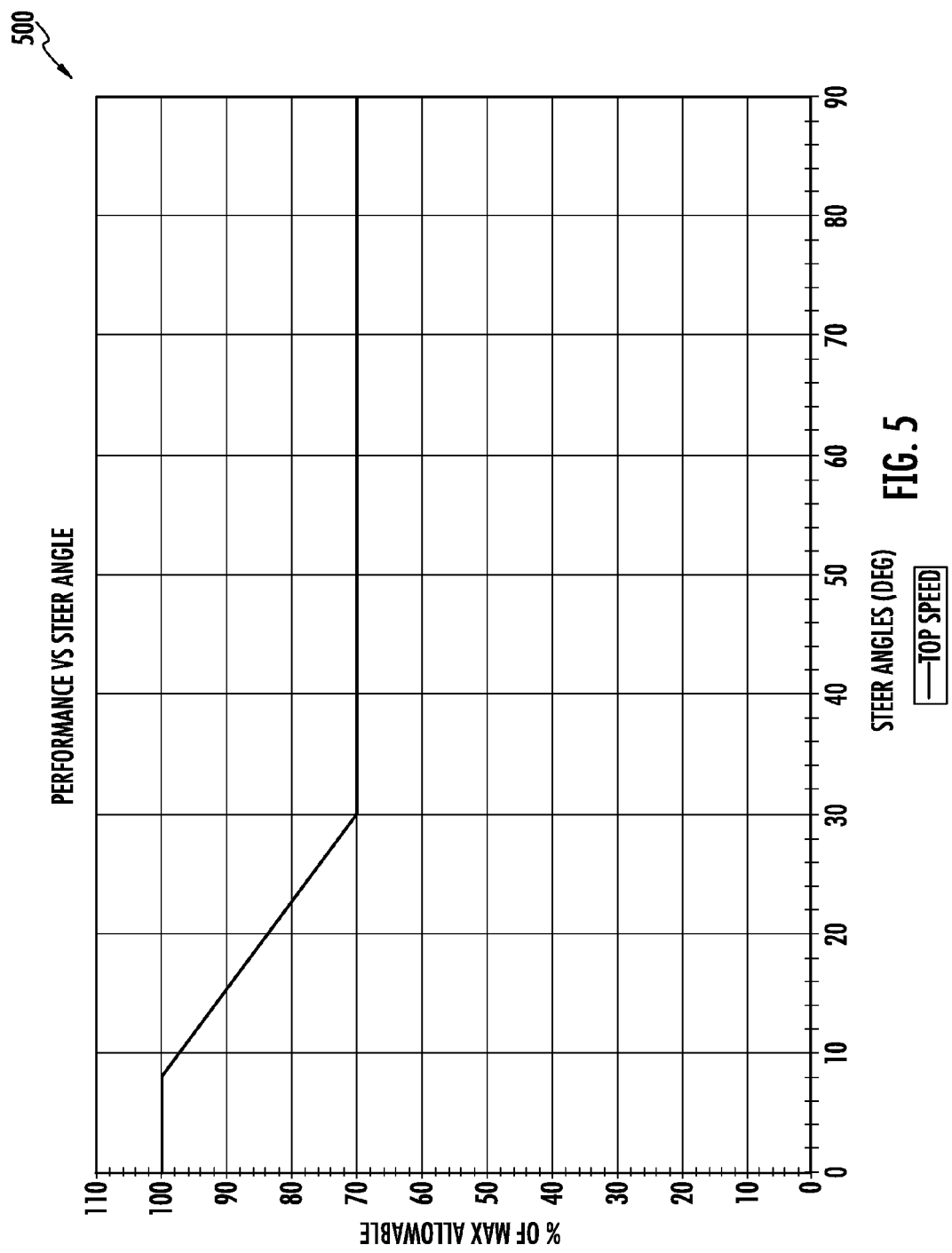
FIG. 5 depicts a graph for providing limits on maximum vehicle speed, versus steer angle, according to embodiments shown and described herein.

FIG. 5 depicts a graph 500 for providing limits on maximum vehicle speed, versus steer angle, according to embodiments shown and described herein. As illustrated, the graph 500 depicts a representation of steer angle versus maximum allowable vehicle speed with 100% of the maximum vehicle speed being allowed when the steer angle is 0 to about 8 degrees. From about 8 degrees to about 30 degrees of steer angle, the maximum allowable speed reduces from about 100% to about 70%. From about 30 degrees of steer angle to about 90 degrees of steer angle, the maximum allowable speed is flat at about 70%.

It should be understood that while the graphs 400, 500 of FIGS. 4 and 5 depict embodiments of limits that may be placed on the vehicle 106, these are merely examples. Additionally, other limits on the vehicle 106 may also be implemented, as depicted below in Tables 1-4. It should also be understood that the VCM 112 may communicate with the NCM 114 to coordinate the various conditions of manual operation and automatic operation of the vehicle 106, such as vehicle limit data. As such, Tables 1-4 represent examples of data that may be sent from the VCM 112 to the NCM 114, depending on the configuration.

TABLE 1

| VCM 112 communication of traction limits to the NCM 114. | |
|---|---|
| Producer | VCM |
| CAN ID | A/B |
| Purpose | Traction Feedback and Limits |
| Length | 8 |
| Consumers | NCM |
| Report Rate | Every 16 mS |

| Byte | Contents | Description | Units/Scaling |
|---|---|---|---|
| Byte 0 | TrxSpdFB (LSB) | −32000 to +32000 | mm/sec |
| Byte 1 | TrxSpdFB (MSB) | | |
| Byte 2 | TrxSpdLimit (LSB) | −32000 to +32000 | mm/sec |
| Byte 3 | TrxSpdLimit (MSB) | | |
| Byte 4 | TrxAccelForceLimit (LSB) | −32000 to +32000 | N |
| Byte 5 | TrxAccelForceLimit (MSB) | | |
| Byte 6 | TrxDecelForceLimit (LSB) | −32000 to +32000 | N |
| Byte 7 | TrxDecelForceLimit (MSB) | | |

As illustrated, Table 1 identifies traction data that may be sent from the VCM 112 to the NCM 114 via the navigation control interface. Specifically, the purpose of the message in Table 1 is traction feedback and vehicle traction limits. While Table 1 indicates that the data is sent as an 8 byte message, this is merely an example. Regardless, Table 1 illustrates that byte 0 and byte 1 are utilized for traction speed feedback. Bytes 2 and 3 may be utilized for identifying a traction speed limit. Bytes 4 and 5 may be utilized to identify a traction acceleration force limit. Bytes 6 and 7 may be utilized to identify a traction deceleration force limit.

Specifically, the traction speed feedback of bytes 0 and 1 may be communicated from the VCM 112 to the NCM 114 to identify a current speed and/or traction state that the vehicle 106 is experiencing. Additionally, the vehicle 106 may be subject to one or more vehicle limits that are imposed. The vehicle limits may include a speed limit, an acceleration limit, and/or a deceleration limit.

TABLE 2

| VCM 112 communication of steering limits to the NCM 114 | |
|---|---|
| Producer | VCM |
| CAN ID | A/B |
| Purpose | Steering Feedback and Limits |
| Length | 8 |
| Consumers | NCM |
| Report Rate | Every 16 mS |

| Byte | Contents | Description | Units/Scaling |
|---|---|---|---|
| Byte 0 | WhAngFB (LSB) | −18000 to +18000 | Deg * 100 |
| Byte 1 | WhAngFB (MSB) | | |
| Byte 2 | WhAngLimitCCW (LSB) | −18000 to +18000 | Deg * 100 |
| Byte 3 | WhAngLimitCCW (MSB) | | |
| Byte 4 | WhAngLimitCW (LSB) | −18000 to +18000 | Deg * 100 |
| Byte 5 | WhAngLimitCW (MSB) | | |

TABLE 2-continued

| | VCM 112 communication of steering limits to the NCM 114 | | |
|---|---|---|---|
| Byte 6 | WhAngRateLimit (LSB) | 0 to +65535 | Deg/ |
| Byte 7 | WhAngRateLimit (MSB) | | sec * 1000 |

Table 2 includes steering data that is sent from the VCM 112 to the NCM 114 via the navigation control interface. Specifically, bytes 0 and 1 may be utilized to provide a wheel angle feedback (current wheel angle) of the vehicle. Bytes 2 and 3 may be utilized to identify a counterclockwise maximum wheel angle. Bytes 4 and 5 may be utilized to identify a clockwise maximum wheel angle. Bytes 6 and 7 may be utilized to identify a wheel angle rate limit of rotation.

TABLE 3

| | VCM 112 communication of hoist limits to the NCM 114 | | |
|---|---|---|---|
| Producer | | VCM | |
| CAN ID | | A/B | |
| Purpose | | Hoist Feedback and Limits | |
| Length | | 8 | |
| Consumers | | NCM | |
| Report Rate | | Every 16 mS | |

| Byte | Contents | Description | Units/Scaling |
|---|---|---|---|
| Byte 0 | ForkHgt(LSB) | 0 to +32000 | mm |
| Byte 1 | ForkHgt(MSB) | | |
| Byte 2 | HoistSpdLimit (LSB) | −32000 to +32000 | mm/sec |
| Byte 3 | HoistSpdLimit (MSB) | | |
| Byte 4 | HoistAccelLimit (LSB) | −32000 to +32000 | mm/sec$^2$ |
| Byte 5 | HoistAccelLimit (MSB) | | |
| Byte 6 | HgtLimit (LSB) | 0 to +32000 | mm |
| Byte 7 | HgtLimit (MSB) | | |

Table 3 includes hoist data that may be communicated by the VCM 112 to the NCM 114 via the navigation control interface. Specifically, the data provided in this message reports information regarding the current state of the fork. Accordingly, bytes 0 and 1 may be utilized to identify the fork height feedback (current fork height) of the vehicle 106. Bytes 2 and 3 may be utilized to identify a fork hoist speed limit of the vehicle 106. Bytes 4 and 5 may be utilized to identify a hoist acceleration limit of the fork. Bytes 6 and 7 may be utilized to identify a hoist height limit of the fork. Additionally, other data may be provided to the NCM 114, such as current load weight, current vehicle speed, etc. This other data may be provided within one of the data communications depicted in Tables 1-4 and/or via other data messages.

TABLE 4

| | VCM 112 communication of accessory limits to the NCM 114. | | |
|---|---|---|---|
| Producer | | VCM | |
| CAN ID | | A/B | |
| Purpose | | Accessory 1 Feedback and Limits* | |
| Length | | 8 | |
| Consumers | | NCM | |
| Report Rate | | Every 16 mS | |

| Byte | Contents | Description | Units/Scaling |
|---|---|---|---|
| Byte 0 | Accy 1 Pos (LSB) | | Deg or mm |
| Byte 1 | Accy 1 Pos (MSB) | | |
| Byte 2 | Accy 1 UpperLimit (LSB) | | Deg or mm |
| Byte 3 | Accy 1 UpperLimit (MSB) | | |
| Byte 4 | Accy 1 LowerLimit (LSB) | | Deg or mm |
| Byte 5 | Accy 1 LowerLimit (MSB) | | |
| Byte 6 | Accy 1 Speed Limit (LSB) | | deg/sec * 100 or |
| Byte 7 | Accy 1 Speed Limit (MSB) | | mm/sec |

Table 4 includes vehicle accessory data that may be communicated by the VCM 112 to the NCM 114 via the navigation control interface. Specifically, bytes 0 and 1 may be utilized to identify an accessory position of an accessory on the vehicle 106. Bytes 2 and 3 may be utilized to identify an accessory upper limit of the vehicle 106. Bytes 4 and 5 may be utilized to identify an accessory lower limit. Bytes 6 and 7 may be utilized to identify an accessory speed limit.

It should be understood that while only one accessory is depicted in Table 4, similar data may be provided for other accessories on the vehicle 106. Similarly, based on the functionality of the accessories, the data in Table 4 may change for each of accessory to which a limit applies.

In Tables 1-4 above, communication between the VCM 112 may indicate one or more limits that are placed on the vehicle 106. Specifically, when operating in manual mode, the vehicle 106 may be subject to the limits stored in the data storage component 336, discussed above. However, when the vehicle 106 is operating in automatic mode, the navigation system 102 and/or the NCM 114 may not be aware of the limits on the vehicle 106. Thus, when the navigation system 102 and/or the NCM 114 provide a speed (or other) command to the VCM 112, the vehicle 106 may not be able to provide the requested performance due to the limits. As such, the information in Tables 1-4 may include limit data on the vehicle 106. The limit data may include a plurality of limits, such as depicted in FIGS. 4 and 5 and/or may simply be a numerical limit, based on the current conditions of the vehicle 106. By facilitating communication of this data, the navigation system 102 and/or NCM 114 will be aware of the limits and only request performance that is within the acceptable ranges.

Figure 6:
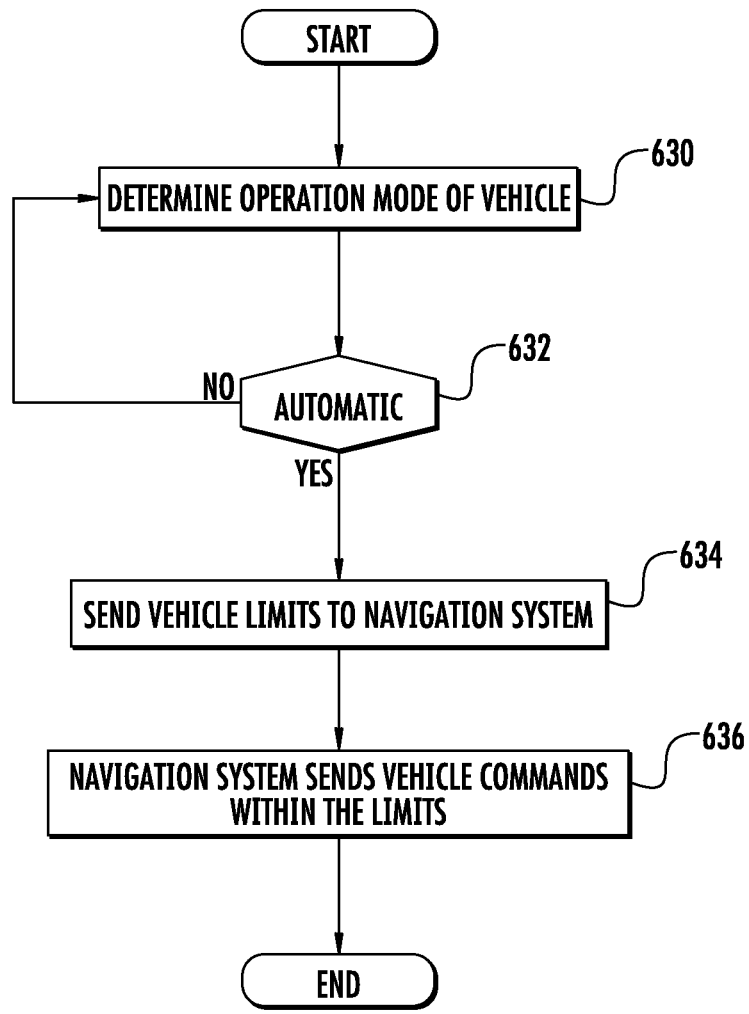
FIG. 6 depicts a flowchart for implementing vehicle limits, according to embodiments shown and described herein.

FIG. 6 depicts a flowchart for implementing vehicle limits, according to embodiments shown and described herein. As illustrated in block 630, a determination may be made regarding the operation mode of the vehicle 106. Specifically, the VCM 112, NCM 114, and/or navigation system 102 may determine whether the vehicle 106 is currently operating in manual mode or automatic mode. If, in block 632, the vehicle 106 is not operating in automatic mode, the process returns to block 630. If the vehicle 106 is operating in automatic mode, in block 634 the VCM 112 may send the vehicle limits to the navigation system 102 and/or to the NCM 114. In block 636, the navigation system 102 and/or NCM 114 sends vehicle commands that are within the vehicle limits.

Figure 7:
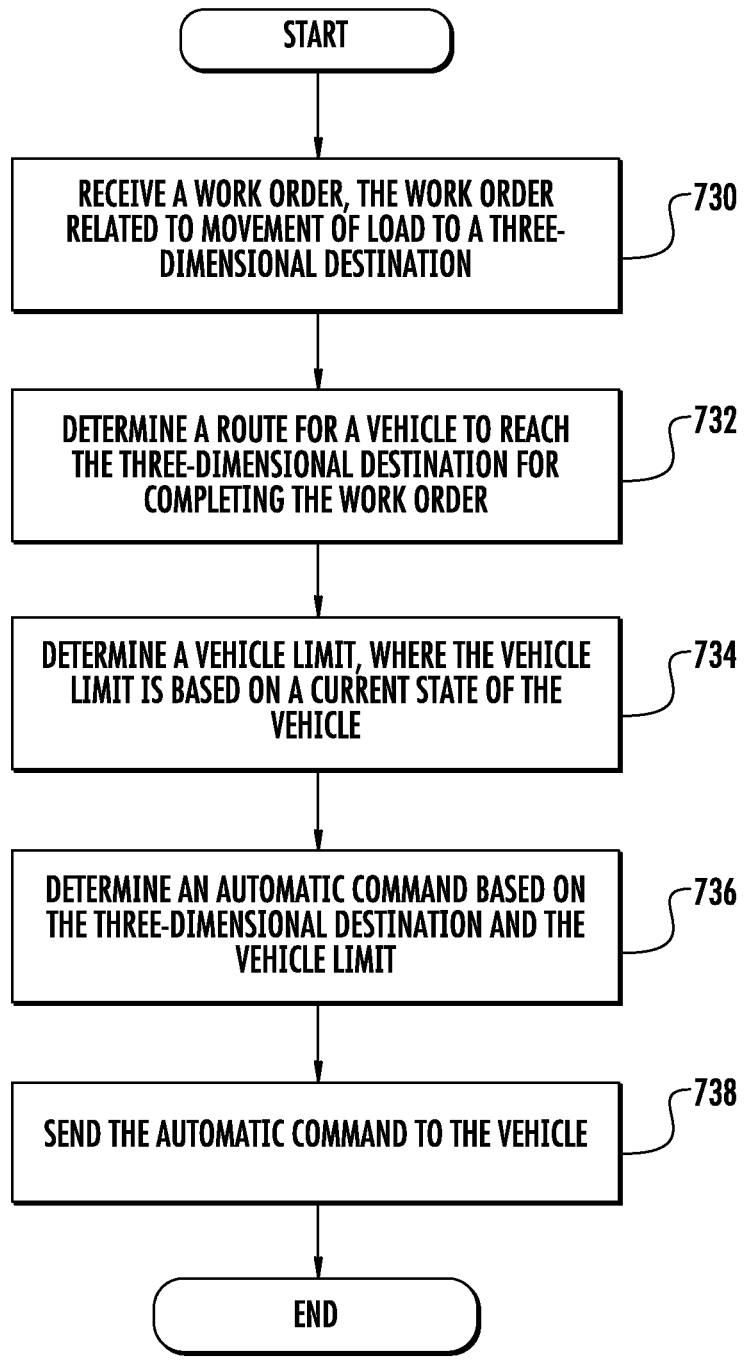
FIG. 7 depicts yet another flowchart for implementing vehicle limits, according to embodiments shown and described herein.

FIG. 7 depicts yet another flowchart for implementing vehicle limits, according to embodiments shown and described herein. As illustrated in block 730, a work order may be received, where the work order is related to movement of a load to a three-dimensional destination. In block 732 a route for the vehicle 106 may be determined to reach the three-dimensional destination for completing the work order. In block 734, a vehicle limit may be determined, where the vehicle limit is based on a current state of the vehicle 106. In block 736, an automatic command is determined based on the there-dimensional destination and the vehicle limit. In block 738, the automatic command is sent to the vehicle 106.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:
   a navigation system; and
   a vehicle that comprises a memory component that stores a program that, when executed by a processor of the vehicle, causes the vehicle to perform at least the following:
   receive data for the vehicle to reach a destination using an automatic control mode;
   determine a vehicle limit, wherein the vehicle limit is based on a current state of the vehicle;
   communicate the vehicle limit from a vehicle control module (VCM) to a navigation control module (NCM), wherein the NCM facilitates automatic control of the vehicle to prevent the NCM from sending a vehicle command to the VCM that violates the vehicle limit.

2. The system of claim 1, wherein the indication for automatic control is received from an external source.

3. The system of claim 2, wherein the external source comprises at least one of the following: a navigation system operator, a vehicle operator, and the navigation system.

4. The system of claim 1, wherein the navigation system determines the destination.

5. The system of claim 1, wherein the current state of the vehicle comprises at least one of the following: a current fork height, a current vehicle speed, a current wheel angle, and a current load weight.

6. The system of claim 1, wherein the vehicle limit comprises at least one of the following: a speed limit, a maximum wheel angle, an acceleration limit, and a deceleration limit.

7. The system of claim 6, wherein the current state of the vehicle upon which the vehicle limit is based comprises a current fork height.

8. The system of claim 6, wherein the current state of the vehicle upon which the vehicle limit is based comprises a current load weight.

9. The system of claim 1, wherein:
   the VCM implements manual control commands; and
   the vehicle limit is received by the NCM from the VCM.

10. The system of claim 1, wherein determining the automatic command comprises:
    determining a vehicle condition; and
    determining an efficient operation of the vehicle to traverse the route, taking into consideration the vehicle condition and without violating the vehicle limit.

11. The system of claim 10, wherein the vehicle condition comprises at least one of the following: a current load weight, a current vehicle speed, a current wheel angle, and a current fork height.

12. The system of claim 1, wherein in response to the NCM receiving the automatic command, the NCM communicates the vehicle limit to the navigation system.

13. The system of claim 1, wherein the VCM communicates at least one of the following to the NCM: a traction speed feedback, a traction speed limit, a traction acceleration force limit, a traction deceleration force limit, a wheel angle feedback, a counterclockwise maximum wheel angle, clockwise maximum wheel angle, wheel rate limit, a fork height feedback, a hoist speed limit, a hoist acceleration limit, a fork height limit, an accessory position, an accessory upper limit, an accessory lower limit, and an accessory speed limit.

14. The system of claim 1, further comprising a management computing device for processing the work order, wherein:
    the work order identifies a location of a product that needs to be moved;
    the management computing device sends data related to the location of the product to the navigation system; and
    the navigation system determines whether the vehicle will complete the work order.

15. The system of claim 1, wherein the destination comprises a three-dimensional destination.

16. The system of claim 1, wherein the navigation system comprises a server.

17. A method comprising:
    receiving a work order, the work order related to a three-dimensional destination;
    determining data for a vehicle to reach the three-dimensional destination;
    determining a vehicle limit, wherein the vehicle limit is based on a current state of the vehicle; and
    sending the vehicle limit to a navigation control module (NCM) to prevent the NCM from sending a command that violates the vehicle limit.

18. A vehicle, comprising:
    a memory component that stores a program that, when executed by a processor, causes the vehicle to perform at least the following:
    receive data regarding a destination;
    determine a vehicle limit of the vehicle, wherein the vehicle limit is based on a current state of the vehicle; and
    communicate the vehicle limit to a navigation control module (NCM) to prevent the NCM from sending a command that violates the vehicle limit.

19. The vehicle of claim 18, wherein navigating the vehicle to the destination comprises the NCM communicating with a vehicle control module (VCM) to provide a control command.

* * * * *